US012787909B2

(12) United States Patent
Garner et al.

(10) Patent No.: US 12,787,909 B2
(45) Date of Patent: Nov. 10, 2026

(54) PRESS WHEEL

(71) Applicant: DEERE & COMPANY, Moline, IL (US)

(72) Inventors: Elijah B. Garner, East Moline, IL (US); Stanley R. Borkgren, Geneseo, IL (US); Tyler G. Groves, South Jordan, UT (US)

(73) Assignee: Deere & Company, Moline, IL (US)

( * ) Notice: Subject to any disclaimer, the term of this patent is extended or adjusted under 35 U.S.C. 154(b) by 889 days.

(21) Appl. No.: 17/837,539

(22) Filed: Jun. 10, 2022

(65) Prior Publication Data

US 2023/0397523 A1 Dec. 14, 2023

(51) Int. Cl.
*A01C 5/06* (2006.01)

(52) U.S. Cl.
CPC .................................... *A01C 5/068* (2013.01)

(58) Field of Classification Search
CPC ............ A01C 5/068; B60B 27/02; B60B 5/02
See application file for complete search history.

(56) References Cited

U.S. PATENT DOCUMENTS 286,183 A * 10/1883 Dixon ................. B60B 17/0006 295/22
2,687,682 A * 8/1954 Oehler .................. B60B 21/021 172/519
3,870,371 A * 3/1975 Solomon ................. B60B 3/001 301/1
4,153,303 A * 5/1979 Tanner ...................... B60B 5/02 301/5.307
4,634,189 A * 1/1987 LeBlond .................. B60B 3/06 301/64.704
5,398,625 A 3/1995 Johnson et al.
5,611,292 A 3/1997 Clark et al.
5,676,429 A 10/1997 Johnson et al.
5,794,713 A * 8/1998 Berscheid ............... B60B 27/02 172/776
5,970,891 A * 10/1999 Schlagel ................ A01C 5/066 172/555
6,295,939 B1 10/2001 Emms
2008/0179940 A1* 7/2008 Hill ........................... B60C 7/22 301/105.1
2008/0303337 A1* 12/2008 Krantz ...................... B60C 7/24 301/5.306

(Continued)

FOREIGN PATENT DOCUMENTS

BR MU8700428-3 U 4/2008
EP 2236317 A1 10/2010

OTHER PUBLICATIONS

Extended European Search Report and Written Opinion issued in European Patent Application No. 23178083.4, dated Nov. 8, 2023, in 09 pages.

*Primary Examiner* — Christopher J Sebesta
*Assistant Examiner* — Julia C Tran
(74) *Attorney, Agent, or Firm* — Taft Stettinius & Hollister LLP; Stephen F. Rost

(57) ABSTRACT

In certain forms, a press wheel is provided for agricultural equipment, the press wheel including: an annular inner rim extending along a rotational axis and defining a central opening; and a wheel body circumferentially surrounding the inner rim; wherein the inner rim comprises a plurality of axially-extending recesses.

24 Claims, 13 Drawing Sheets

(56) References Cited

U.S. PATENT DOCUMENTS

| | | | | |
|---|---|---|---|---|
| 2010/0107946 | A1* | 5/2010 | Cooney | B60B 27/02 111/194 |
| 2010/0253133 | A1* | 10/2010 | Rota | B60C 7/24 301/64.701 |
| 2013/0076104 | A1* | 3/2013 | Hannah | B60B 33/0028 301/35.51 |
| 2015/0223384 | A1* | 8/2015 | Phely | B60B 25/006 172/536 |
| 2017/0355229 | A1* | 12/2017 | Phely | B60C 7/24 |
| 2018/0317376 | A1* | 11/2018 | Gebbeken | A01C 5/068 |
| 2020/0137945 | A1* | 5/2020 | Bot | B29D 30/02 |
| 2020/0253106 | A1 | 8/2020 | Phely | |
| 2022/0055401 | A1* | 2/2022 | Remo | B60C 7/24 |
| 2023/0225240 | A1* | 7/2023 | Schaffert | A01C 5/068 172/1 |
| 2024/0251698 | A1* | 8/2024 | Radtke | A01C 5/068 |

* cited by examiner

PRESS WHEEL

TECHNICAL FIELD

The present disclosure generally relates to press wheels, and more particularly but not exclusively relates to mobile agricultural equipment including one or more press wheels.

BACKGROUND

Press wheels are commonly used in mobile agricultural equipment to press distributed agricultural product (e.g., seed) into a furrow. However, many conventional press wheels suffer from certain drawbacks and limitations. For example, when the ground being seeded is muddy, mud sticking to the press wheel may actually pull seed out of the furrow. For these reasons among others, there remains a need for further improvements in this technological field.

SUMMARY

Certain embodiments of the present application relate to a press wheel for agricultural equipment, the press wheel comprising: an annular inner rim extending along a rotational axis and defining a central opening; and a wheel body circumferentially surrounding the inner rim; wherein the inner rim comprises a plurality of axially-extending recesses.

In certain embodiments, each of the axially-extending recesses is an axially-extending slot.

In certain embodiments, the inner rim has a first side and a second side opposite the first side; and wherein the plurality of axially-extending recesses comprises a plurality of first axially-extending recesses and a plurality of second axially-extending recesses; wherein each of the first axially-extending recesses extends from the first side toward the second side; and wherein each of the second axially-extending recesses extends from the second side toward the first side.

In certain embodiments, the first axially-extending recesses and the second axially-extending recesses alternate about a circumference of the inner rim.

In certain embodiments, the inner rim comprises a serpentine shape defined at least in part by the plurality of axially-extending recesses.

In certain embodiments, the wheel body comprises a plurality of ridges; and wherein the plurality of ridges are received in and engaged with the plurality of axially-extending recesses.

In certain embodiments, the inner rim is chemically bonded to the wheel body.

In certain embodiments, the wheel body comprises an elastomeric material.

In certain embodiments, the press wheel further comprises a bearing positioned in the central opening and forming a press fit with the inner rim.

In certain embodiments, the press wheel further comprises an outer rim circumferentially surrounding the wheel body; wherein the outer rim comprises urethane and/or ultra-high molecular weight polyethylene.

Certain embodiments of the present application relate to a method of manufacturing a press wheel for agricultural equipment, the method comprising: over-molding a wheel body onto at least one additional component, wherein the at least one additional component comprises an outer rim; wherein the outer rim comprises a plastic material; and wherein the wheel body comprises an elastomeric material.

In certain embodiments, the plastic material comprises urethane and/or ultra-high molecular weight polyethylene.

In certain embodiments, the at least one additional component further comprises an inner rim; wherein the inner rim comprises a plurality of recesses; and wherein the over-molding forms the wheel body with a plurality of ridges received in and engaged with the plurality of recesses.

In certain embodiments, the outer rim comprises: a rim body; and a plurality of flanges projecting inward from the rim body.

In certain embodiments, one or more of the flanges comprises one or more openings; and wherein the over-molding forms the wheel body with one or more projections received in the one or more openings.

In certain embodiments, one or more of the flanges extends axially, and partially defines a face of the press wheel.

In certain embodiments, the method further comprises, prior to over-molding the wheel body onto the at least one additional component, forming the outer rim of a plurality of modular segments.

In certain embodiments, forming the outer rim comprises interlocking one or more of the modular segments with an adjacent one of the modular segments.

In certain embodiments, the at least one additional component comprises an inner rim; and wherein forming the outer rim comprises interlocking one or more of the modular segments with the inner rim.

In certain embodiments, the method further comprises: inserting a bearing into a central aperture of the wheel body; and capturing an outer portion of the bearing and an inner portion of the wheel body between a pair of interlocking pieces, thereby coupling the bearing with the wheel body.

Certain embodiments of the present application relate to a press wheel [300] for agricultural equipment [100], the press wheel [300] comprising: an annular inner rim [320] extending along a rotational axis [301] and defining a central opening [321]; and a wheel body [330] circumferentially surrounding the inner rim [320]; wherein the inner rim [320] comprises a plurality of axially-extending recesses [326, 326'].

In certain embodiments, the inner rim [320] has a first side [322] and a second side [324] opposite the first side [322]; wherein the plurality of axially-extending recesses [326, 326'] comprises a plurality of first axially-extending recesses [326] and a plurality of second axially-extending recesses [326']; wherein each of the first axially-extending recesses [326] extends from the first side [322] toward the second side [324]; and wherein each of the second axially-extending recesses [326'] extends from the second side [324] toward the first side [322].

In certain embodiments, the first axially-extending recesses [326] and the second axially-extending recesses [326'] alternate about a circumference of the inner rim [320].

In certain embodiments, the inner rim [320] comprises a serpentine shape defined at least in part by the plurality of axially-extending recesses [326, 326']; or wherein the wheel body [330] comprises a plurality of ridges [336] received in and engaged with the plurality of axially-extending recesses [326, 326'].

In certain embodiments, the inner rim [320] is chemically bonded to the wheel body [330]; or wherein each of the axially-extending recesses [326, 326'] is an axially-extending slot [326, 326'].

In certain embodiments, the press wheel further comprises a bearing [340] positioned in the central opening [321] and forming a press fit with the inner rim [320].

In certain embodiments, the press wheel further comprises an outer rim [310] circumferentially surrounding the wheel body [330]; wherein the outer rim [310] comprises urethane and/or ultra-high molecular weight polyethylene.

Certain embodiments of the present application relate to a method [1300] of manufacturing a press wheel for agricultural equipment, the method [1300] comprising: over-molding [1320] a wheel body [330, 430, 530, 630, 730] onto at least one additional component, wherein the at least one additional component comprises an outer rim [310, 410, 510, 610, 710, 800, 900, 1010, 1110, 1210]; wherein the outer rim [310, 410, 510, 610, 710, 800, 900, 1010, 1110, 1210] comprises a plastic material; and wherein the wheel body [330, 430, 530, 630, 730] comprises an elastomeric material different from the plastic material.

In certain embodiments, the plastic material comprises urethane and/or ultra-high molecular weight polyethylene.

In certain embodiments, the at least one additional component further comprises an inner rim [320]; wherein the inner rim [320] comprises a plurality of recesses [326, 326']; and wherein the over-molding [1320] forms the wheel body [330, 430, 530, 630, 730] with a plurality of ridges [336] received in and engaged with the plurality of recesses [326, 326'].

In certain embodiments, the outer rim [410, 510, 610, 710, 800, 900] comprises: a rim body [412, 512, 612, 712, 802, 902]; and a plurality of flanges [414, 514, 614, 714, 814, 914] projecting inward from the rim body [412, 512, 612, 712, 802, 902].

In certain embodiments, one or more of the flanges [414, 614] comprises one or more openings [415, 615] such that the over-molding forms the wheel body [330, 430, 530, 630, 730] with one or more projections received in the one or more openings [415, 615]; or wherein one or more of the flanges [714] extends axially, and partially defines a face of the press wheel.

In certain embodiments, the method further comprises, prior to over-molding [1320] the wheel body onto the at least one additional component, forming [1310] the outer rim [800, 900] of a plurality of modular segments [810, 910].

In certain embodiments, forming [1310] the outer rim [800] comprises interlocking one or more of the modular segments [810] with an adjacent one of the modular segments [810].

In certain embodiments, the at least one additional component comprises an inner rim [320]; and wherein forming the outer rim [900] comprises interlocking one or more of the modular segments [910] with the inner rim [320].

Further embodiments, forms, features, and aspects of the present application shall become apparent from the description and figures provided herewith.

DETAILED DESCRIPTION OF ILLUSTRATIVE EMBODIMENTS

Figure 1:
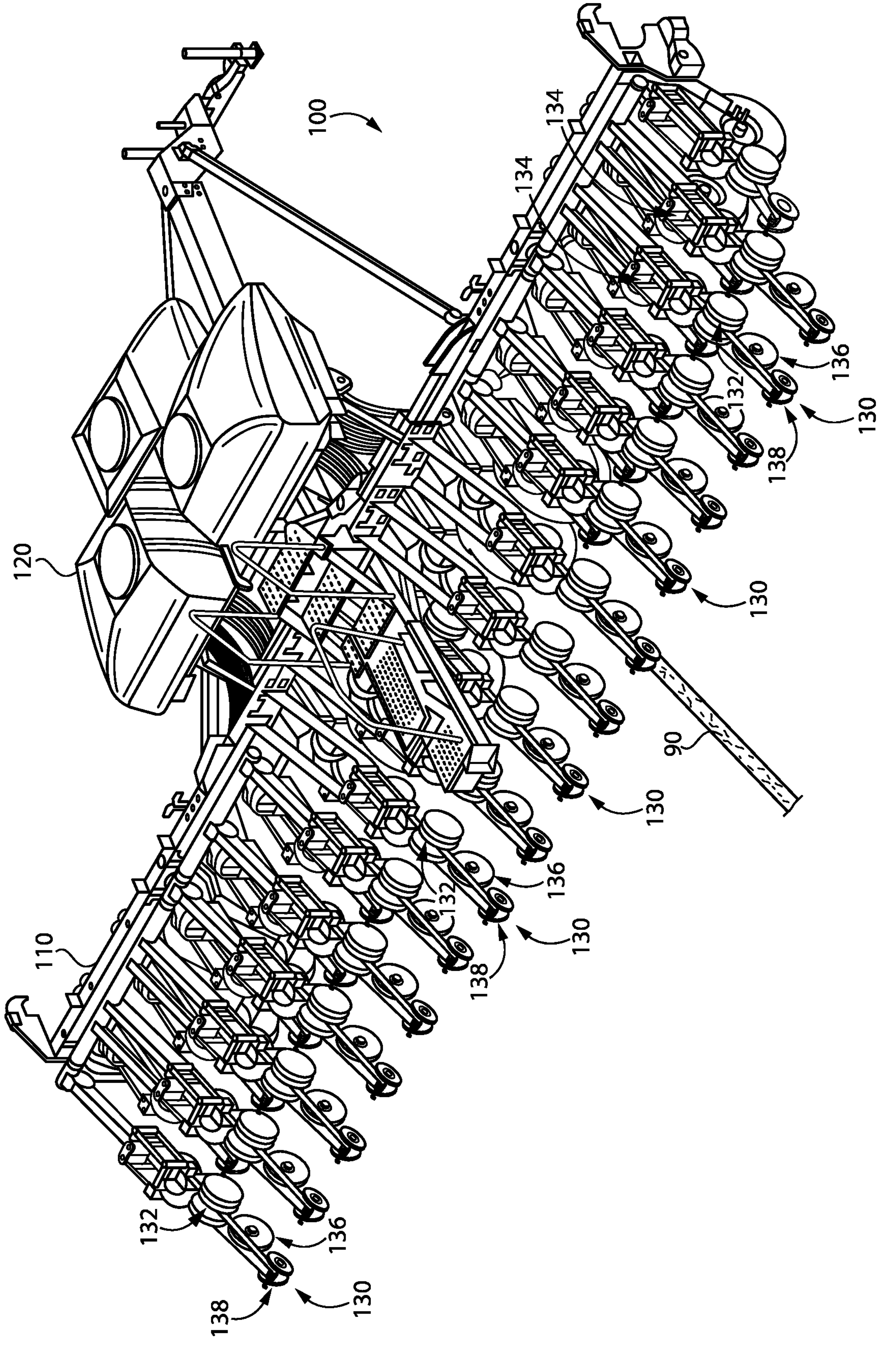
FIG. 1 is a perspective view of mobile agricultural equipment according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is mobile agricultural equipment in the form of a seeder 100 according to certain embodiments. The seeder 100 generally includes a frame 110, one or more reservoirs 120 operable to hold an agricultural product (e.g., seed), and a plurality of row units 130 mounted to the frame 110. As described herein, the seeder 100 is configured to form furrows 90 in the ground, each furrow 90 being provided with agricultural product from the reservoir 120 via the row units 130.

Each row unit 130 includes one or more components to perform corresponding operations for the process of forming and seeding the furrows 90. In the illustrated form, each row unit 130 generally includes an opening disk 132 that opens the furrow 90, a distribution unit 134 that distributes seed into the opened furrow 90, a press wheel 136 that presses the seed into the furrow 90, and a closing wheel 138 that covers the seed and closes the furrow 90.

Figure 2:
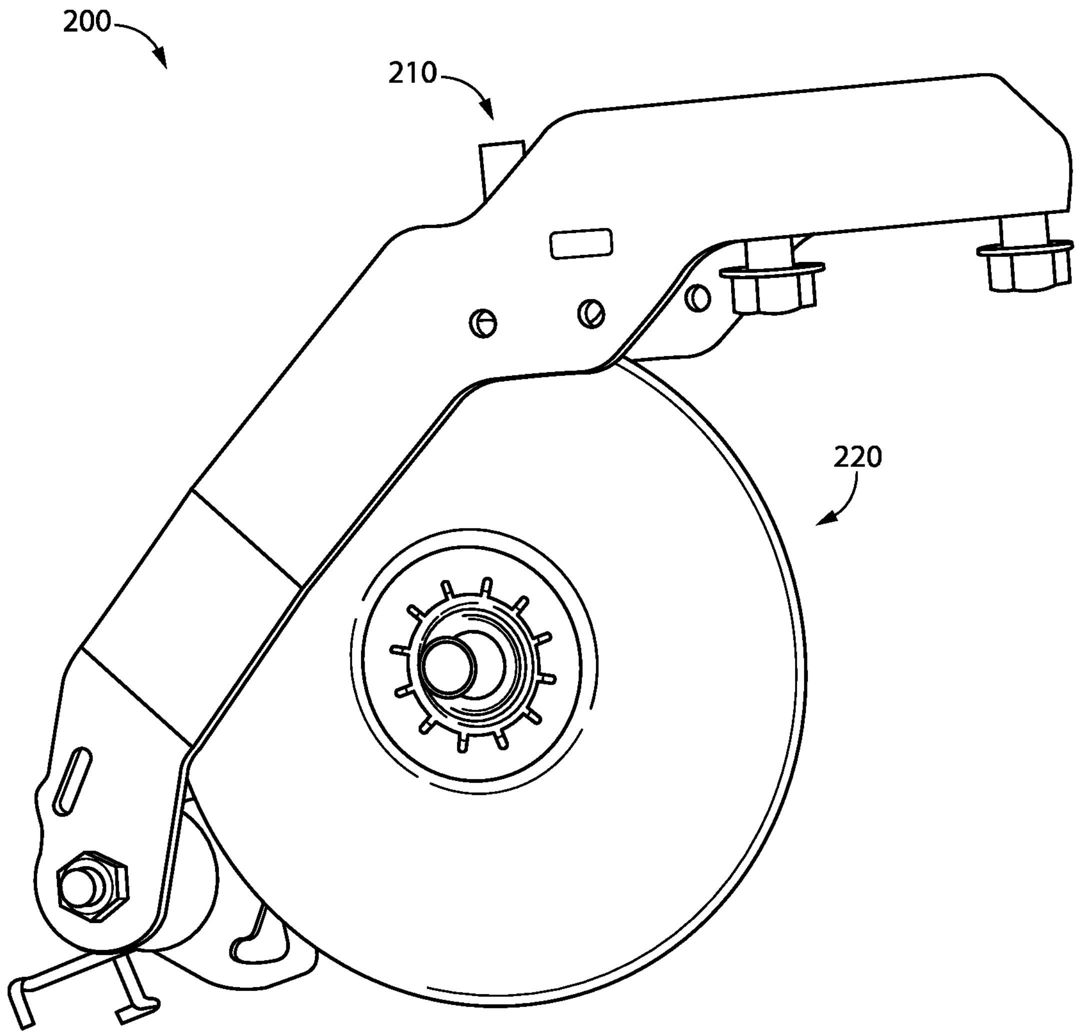
FIG. 2 is a perspective view of a press wheel assembly according to certain embodiments.

With additional reference to FIG. 2, illustrated therein is a press wheel assembly 200 according to certain embodiments. The press wheel assembly 200 may, for example, be provided in one or more of the row units 130 of the above-described seeder 100. The press wheel assembly 200 generally includes a frame 210 and a press wheel 220 rotatably mounted to the frame 210. In the illustrated arrangement, the press wheel assembly 200 is provided in a retracted configuration, in which the press wheel 220 is retracted to a position adjacent the frame 210. From this configuration, the press wheel assembly 200 may be moved to a deployed configuration, in which the press wheel 220 is positioned generally below and/or behind the frame 210.

Figure 3:
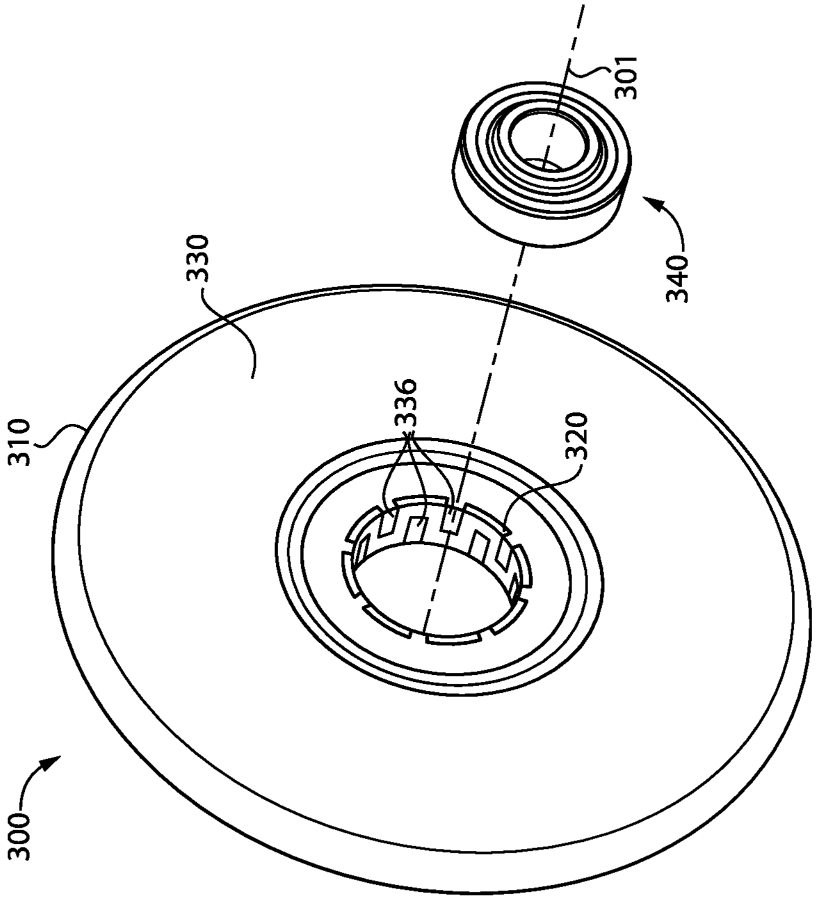
FIG. 3 is an exploded assembly view of a press wheel according to certain embodiments.

With additional reference to FIG. 3, illustrated therein is a press wheel 300 according to certain embodiments. The press wheel 300 may, for example, be utilized in the press wheel assembly 200 and/or as the press wheel 136 of the above-described row units 130. The press wheel 300 is rotatable about a rotational axis 301, and generally includes an outer rim 310, an inner rim 320, and a body portion 330 extending between and connecting the outer rim 310 and the inner rim 320. In the illustrated form, the press wheel 300 further includes a bearing 340 that facilitates the rotational coupling of the wheel 300 to a frame (e.g., the frame 210).

In the illustrated embodiment, the outer rim 310 and the wheel body 330 are integrally formed as a monolithic or single-piece construction. As described herein, it is also contemplated that the outer rim 310 may be one or more distinct components to which the wheel body 330 is attached.

Figure 4:
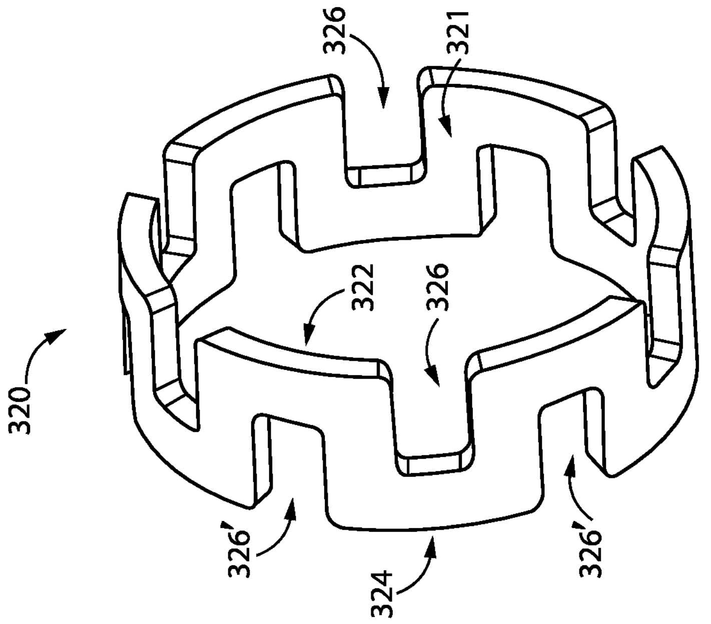
FIG. 4 is a perspective view of an inner rim according to certain embodiments.

With additional reference to FIG. 4, the inner rim 320 of the illustrated press wheel 300 is generally annular, and has a serpentine configuration about its circumference. The inner rim 320 has a central opening 321, a first axial side 322 and an axially-opposite second side 324, and recesses in the form of slots 326, 326' alternatingly extend from the two sides 322, 324 to at least partially define the serpentine structure of the inner rim 320. More particularly, first slots 326 extend axially from the first axial side 322 toward the second axial side 324, and second slots 326 extend axially from the second axial side 324 toward the first axial side 322. As described herein, this serpentine configuration may serve one or more functions for the press wheel 300, such as providing greater tolerances and/or reducing relative axial movement of the inner rim 320 and wheel body 330. In certain forms, the inner rim 320 may be formed of a metal material, such as steel.

The wheel body 330 is somewhat flexible, and may, for example, be formed of an elastomeric material. In certain embodiments, the wheel body 330 is over-molded onto the outer rim 310 and/or the inner rim 320. Additionally or alternatively, the wheel body 330 may be connected to the outer rim 310 and/or the inner rim 320 via mechanical and/or chemical fasteners. As one example, a bonding agent may provide a chemical adhesion between the wheel body 330 and at the outer rim 310 and/or the inner rim 320. In certain embodiments, at least a portion of the wheel body 330 may be hollow. In certain embodiments, the wheel body 330 may be solid and substantially without hollow portions.

In certain embodiments, such as those in which the wheel body 330 is over-molded onto the inner rim 320, the wheel body 330 may be provided with ridges 336 corresponding to the slots 326 of the inner rim 320. These ridges 336 engage the slots 326 and discourage relative axial shifting of the inner rim 320 and wheel body 330. The slots 326 also render the inner rim 320 more flexible than a truly annular inner rim would be, which may provide for increased tolerances for press-fitting the bearing 340 into the central opening of the inner rim 320.

As noted above, in the illustrated form, the outer rim 310 and the wheel body 330 are provided as a single-piece construction. In certain embodiments, this single-piece construction may, for example, be formed by injecting a liquid elastomeric composition into an appropriately-shaped mold. Moreover, the liquid composition may be mixed with a plastic powder that renders the resulting outer rim 310 and/or wheel body 330 less susceptible to having mud and other debris stick thereon. For example, at least some of the elastomeric composition may be mixed with ultra-high molecular weight polyethylene (UHMWPE) powder. In certain embodiments, the UHMWPE powder may be at least 5% of the total weight of the mixture, at least 10% of the total weight of the mixture, at least 20% of the total weight of the mixture, at least 30% of the total weight of the mixture, at least 40% of the total weight of the mixture, at least 50% of the total weight of the mixture, or at least 60% of the total weight of the mixture. Additionally, it is also contemplated that such a mixture may be utilized to form the wheel bodies of other embodiments described herein.

Figure 5:
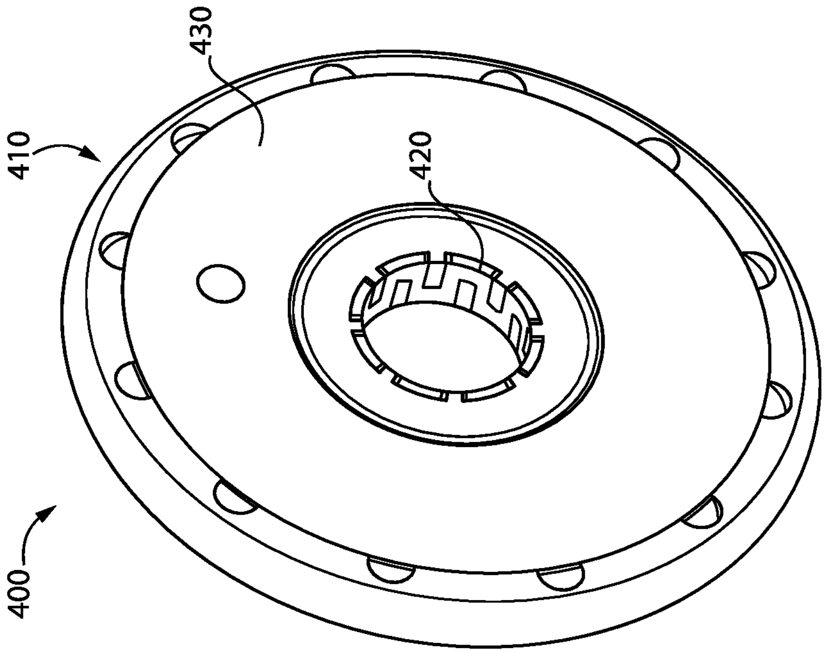
FIG. 5 is a perspective view of a press wheel according to certain embodiments.

With additional reference to FIG. 5, illustrated therein is a press wheel 400 according to certain embodiments. The press wheel 400 may, for example, be utilized in the press wheel assembly 200 and/or as the press wheel 136 of the above-described row units 130. The press wheel 400 is substantially similar to the press wheel 300 illustrated in FIGS. 3 and 4, and similar reference characters are used to indicate similar elements and features. For example, the press wheel 400 generally includes an outer rim 410, an inner rim 420, and a body portion 430, which respectively correspond to the outer rim 310, the inner rim 320, and the body portion 330 of the above-described press wheel 300. In the interest of conciseness, the following description of the press wheel 400 focuses primarily on elements and features that are different from those described above with reference to the press wheel 300.

Figure 6:
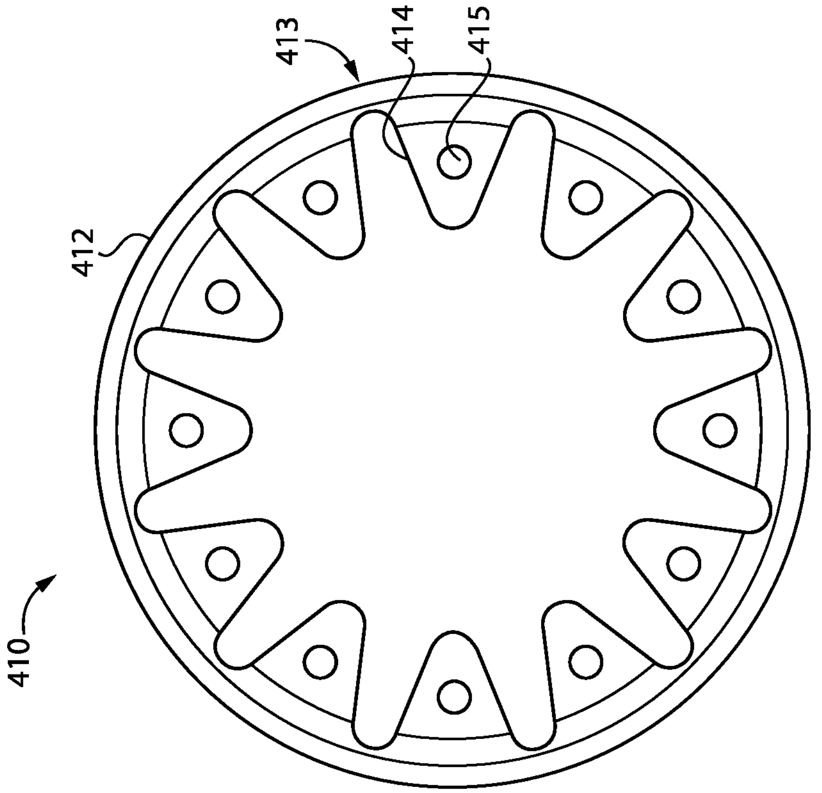
FIG. 6 is a plan view of an outer rim of the press wheel illustrated in FIG. 5.

With additional reference to FIG. 6, the outer rim 410 is defined by at least one discrete component to which the wheel body 430 is attached, for example by over-molding. In certain embodiments, the outer rim 410 is formed of a material different from that utilized for the wheel body 430. In certain forms, the outer rim 410 may be formed of a material that is harder than the relatively softer material utilized for the wheel body 430. The outer rim 410 may, for example, be provided with a Shore A hardness rating of between 40 and 70, such as a hardness of about 60 Shore A (e.g., between 55 Shore A and 65 Shore A). The outer rim 410 may be formed of a plastic material, such as urethane, polyurethane, polyethylene, and/or ultra-high molecular weight polyethylene (UHMWPE).

The outer rim 410 generally includes a rim body 412 and a plurality of flanges 414 projecting radially inward from the rim body 412. The rim body 412 is generally annular, and has a smooth and curved outer surface 413. One or more of the flanges 414 may include an aperture or opening 415 into which material of the wheel body 430 may flow during the over-molding process to mechanically secure the wheel body 430 to the outer rim 410. In certain forms, the wheel body 430 may be formed of a mixture including an elastomeric material and UHMWPE powder as described above.

Figure 7:
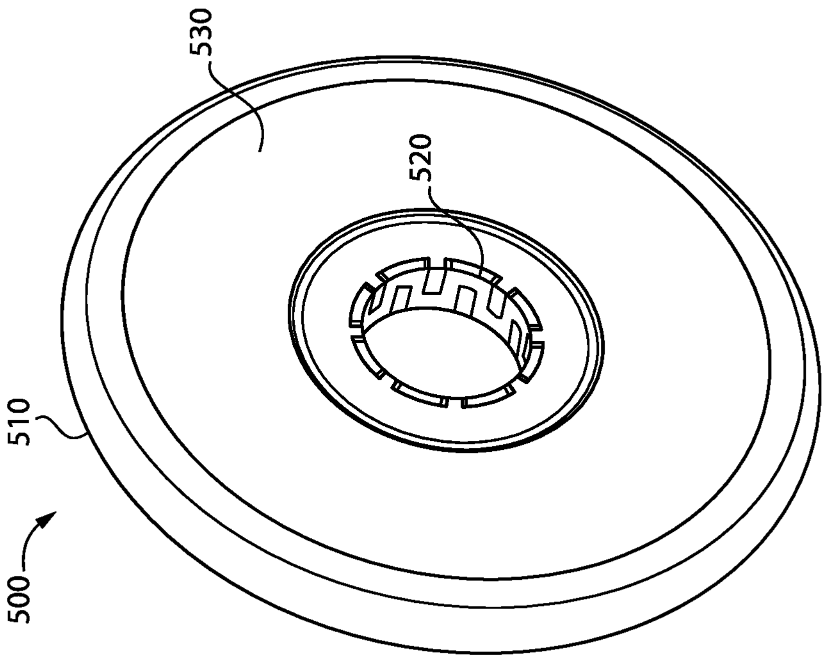
FIG. 7 is a perspective view of a press wheel according to certain embodiments.

With additional reference to FIG. 7, illustrated therein is a press wheel 500 according to certain embodiments. The press wheel 500 may, for example, be utilized in the press wheel assembly 200 and/or as the press wheel 136 of the above-described row units 130. The press wheel 500 is substantially similar to the press wheel 400 illustrated in FIG. 5, and similar reference characters are used to indicate similar elements and features. For example, the press wheel 500 generally includes an outer rim 510, an inner rim 520, and a body portion 530, which respectively correspond to the outer rim 410, the inner rim 420, and the body portion 430 of the above-described press wheel 400. In the interest of conciseness, the following description of the press wheel 500 focuses primarily on elements and features that are different from those described above with reference to the press wheel 400.

Figure 8:
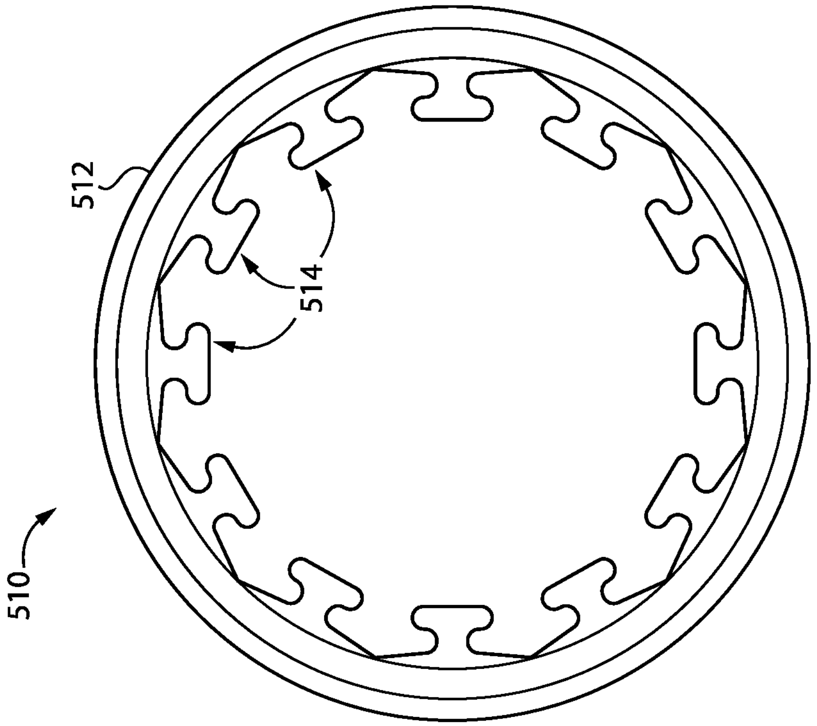
FIG. 8 is a plan view of an outer rim of the press wheel illustrated in FIG. 7.

With additional reference to FIG. 8, the outer rim 510 generally includes a rim body 512 and a plurality of flanges 514 projecting radially inward from the rim body 512. In the illustrated form, the flanges 514 are generally T-shaped, which may aid in mechanically securing the wheel body 530 to the outer rim 510.

Figure 9:
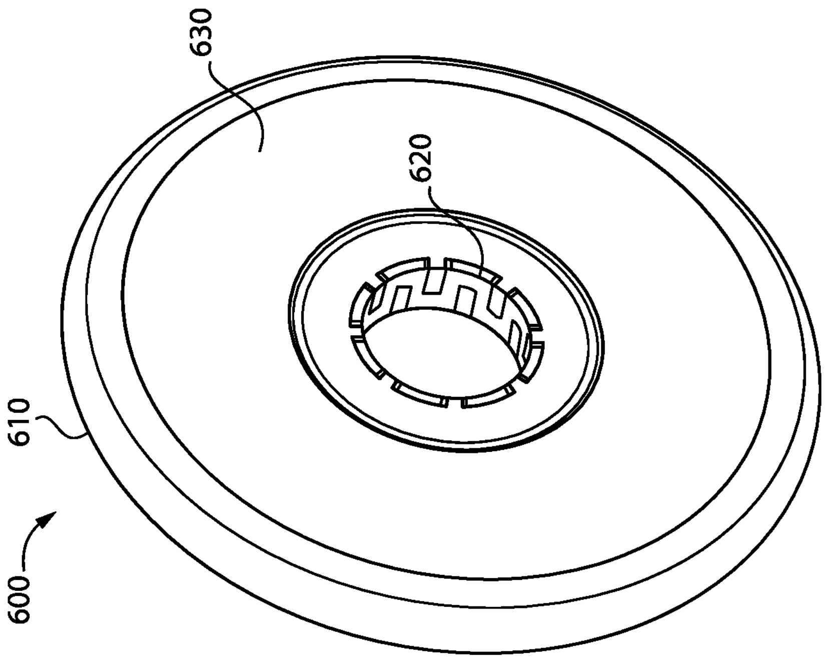
FIG. 9 is a perspective view of a press wheel according to certain embodiments.

With additional reference to FIG. 9, illustrated therein is a press wheel 600 according to certain embodiments. The press wheel 600 may, for example, be utilized in the press wheel assembly 200 and/or as the press wheel 136 of the above-described row units 130. The press wheel 600 is substantially similar to the press wheel 400 illustrated in FIG. 6, and similar reference characters are used to indicate similar elements and features. For example, the press wheel 600 generally includes an outer rim 610, an inner rim 620, and a body portion 630, which respectively correspond to the outer rim 410, the inner rim 420, and the body portion 430 of the above-described press wheel 400. In the interest of conciseness, the following description of the press wheel 600 focuses primarily on elements and features that are different from those described above with reference to the press wheel 400.

Figure 10:
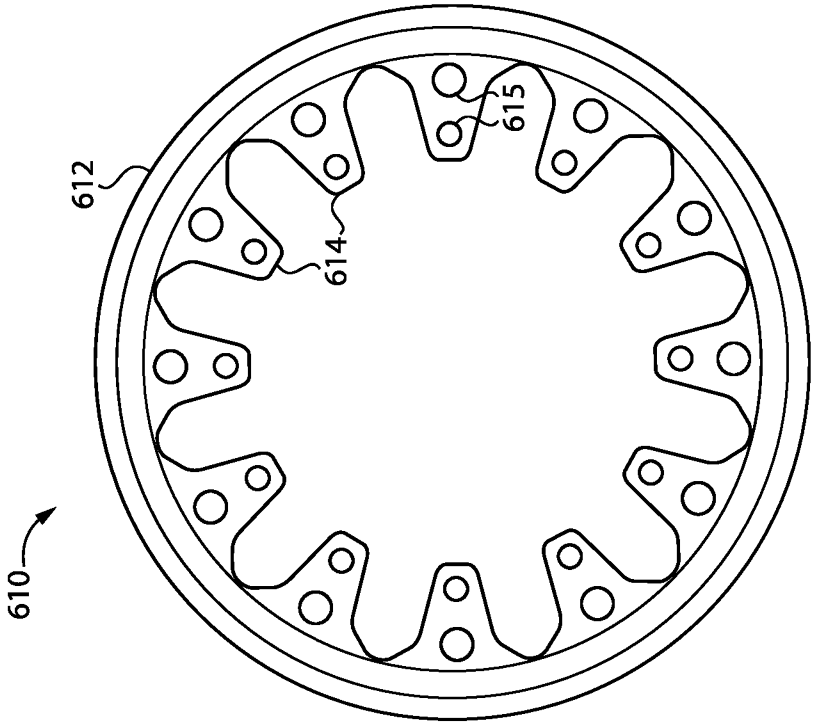
FIG. 10 is a plan view of an outer rim of the press wheel illustrated in FIG. 9.

With additional reference to FIG. 10, the outer rim 610 generally includes a rim body 612 and a plurality of flanges 614 projecting radially inward from the rim body 612. In the illustrated form, each of the flanges 614 includes a pair of apertures 615, which may aid in mechanically securing the wheel body 630 to the outer rim 610. For example, material may flow into the apertures 615 during the over-molding process to thereby form projections within the wheel body 630.

Figure 11:
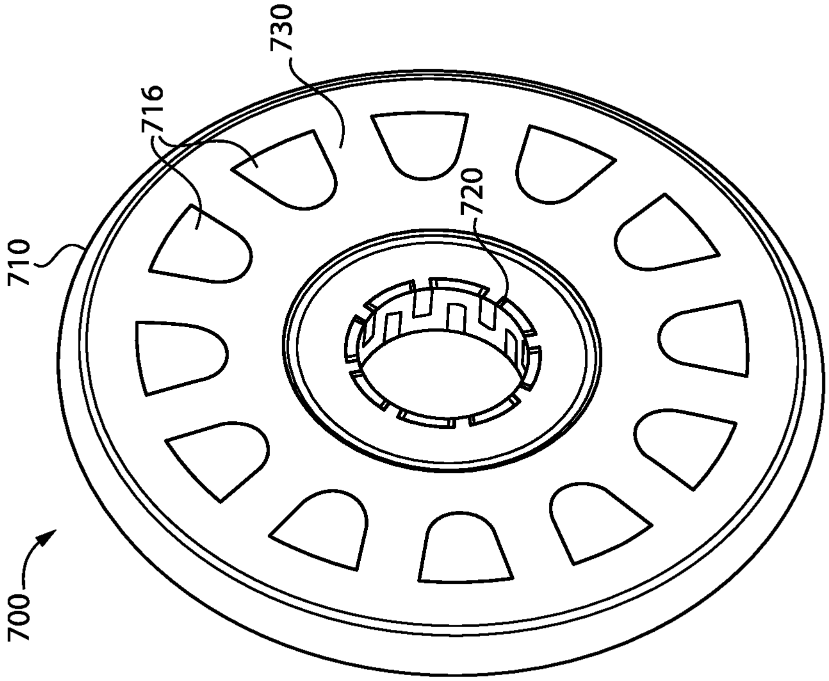
FIG. 11 is a perspective view of a press wheel according to certain embodiments.

With additional reference to FIG. 11, illustrated therein is a press wheel 700 according to certain embodiments. The press wheel 700 may, for example, be utilized in the press wheel assembly 200 and/or as the press wheel 136 of the above-described row units 130. The press wheel 700 is substantially similar to the press wheel 400 illustrated in FIG. 5, and similar reference characters are used to indicate similar elements and features. For example, the press wheel 700 generally includes an outer rim 710, an inner rim 720, and a body portion 730, which respectively correspond to the outer rim 410, the inner rim 420, and the body portion 430 of the above-described press wheel 400. In the interest of conciseness, the following description of the press wheel 700 focuses primarily on elements and features that are different from those described above with reference to the press wheel 400.

Figure 12:
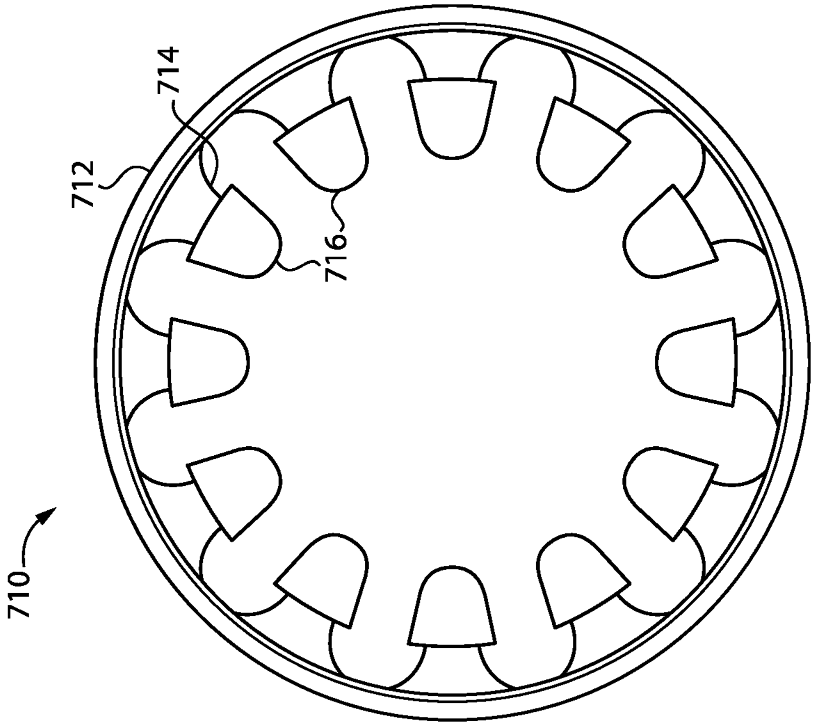
FIG. 12 is a plan view of an outer rim of the press wheel illustrated in FIG. 11.

With additional reference to FIG. 12, the outer rim 710 generally includes a rim body 712 and a plurality of flanges 714 projecting radially inward from the rim body 712. Each flange 714 includes a pair of axially-projecting lobes 716 that project to the axially-outer surface of the press wheel 700 and partially define a face of the press wheel 700. In addition to aiding the mechanical coupling of the wheel body 730 with the outer rim 710, these lobes 716 may discourage detritus (e.g., mud) from sticking to the sidewalls of the press wheel 700.

Figure 13:
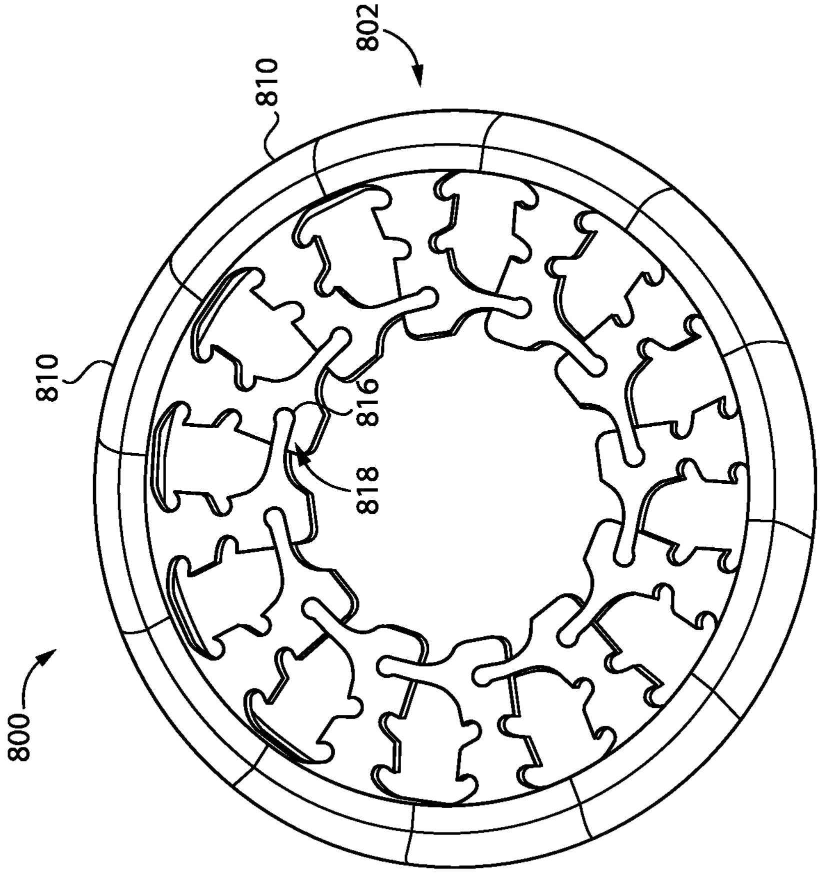
FIG. 13 illustrates an outer rim according to certain embodiments.

With additional reference to FIG. 13, illustrated therein is an outer rim 800 according to certain embodiments. The outer rim 800 includes a rim body 802 and may, for example, be utilized in a press wheel along the lines described above. As one example, the outer rim 800 may be utilized in the press wheel 400 illustrated in FIG. 5 in place of the outer rim 410. As described herein, the illustrated outer rim 800 is formed of a plurality of discrete modular segments 810.

Figure 14:
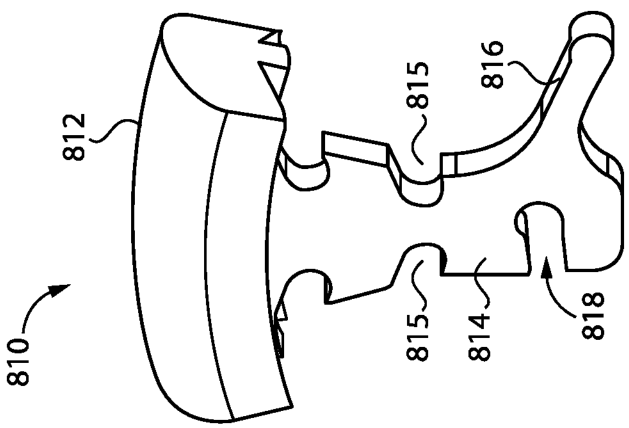
FIG. 14 illustrates a modular component of which the outer rim illustrated in FIG. 13 may be constructed.

With additional reference to FIG. 14, illustrated therein is one of the modular segments 810 of which the outer rim 800 is formed. The modular segment 810 includes a rim body segment 812 and a flange 814 projecting inward from the rim body segment 812. The flange 814 includes one or more recesses 815 that may aid in mechanically coupling the segment 812 to a wheel body that is over-molded onto the outer rim 800, and in the illustrated form further includes a tongue 816 and a groove 818 having a shape complementary to that of the tongue 816.

The outer rim 800 may, for example, be assembled by arranging a plurality of the modular segments 810 such that the arcuate body segments 812 form a generally annular outer rim body while interlocking the tongue 816 of each segment 810 with the groove 818 of an adjacent segment

810. The outer rim 800, and optionally an inner rim along the lines of the inner rim 320, may then be over-molded with an elastomeric material to form the wheel body of a press wheel.

Figure 15:
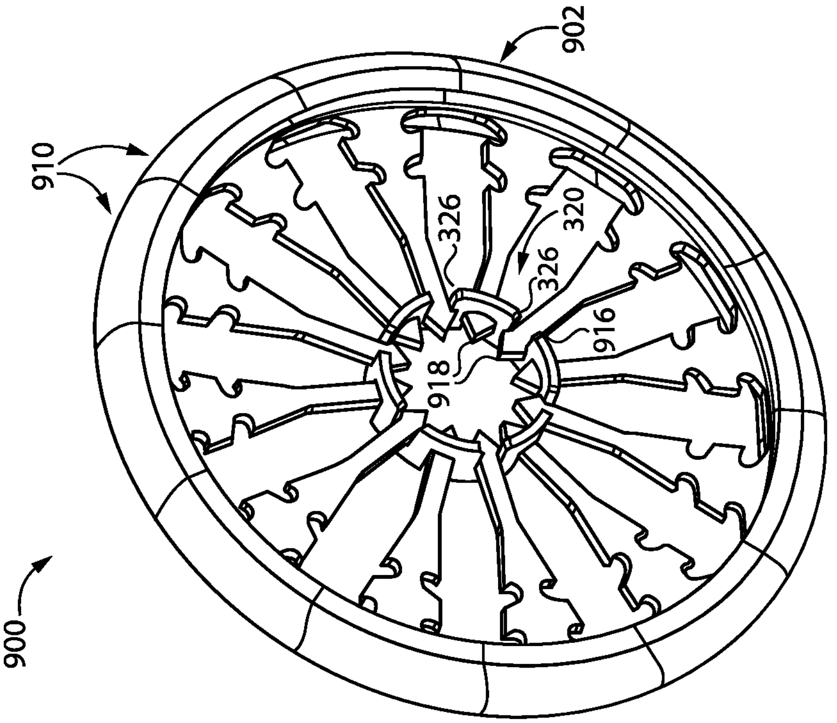
FIG. 15 illustrates an outer rim according to certain embodiments, along with the inner rim illustrated in FIG. 4.

With additional reference to FIG. 15, illustrated therein is an outer rim 900 according to certain embodiments. The outer rim 900 includes a rim body 902 and may, for example, be utilized in a press wheel along the lines described above. As one example, the outer rim 900 may be utilized in the press wheel 400 illustrated in FIG. 5 in place of the outer rim 410. As described herein, the illustrated outer rim 900 is formed of a plurality of discrete modular segments 910.

Figure 16:
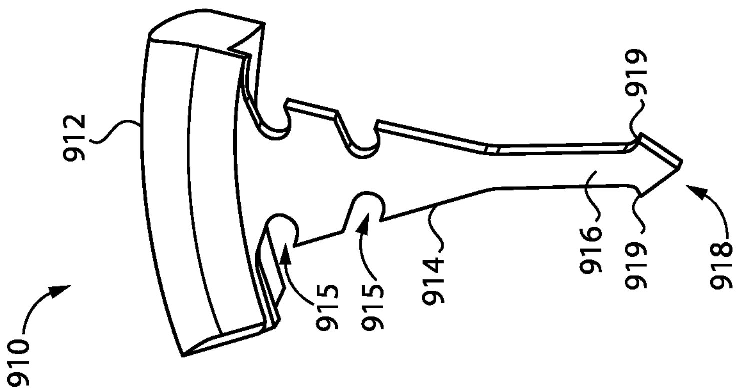
FIG. 16 illustrates a modular component of which the outer rim illustrated in FIG. 15 may be constructed.

With additional reference to FIG. 16, illustrated therein is one of the modular segments 910 of which the outer rim 900 is formed. The modular segment 910 includes a rim body segment 912 and a flange 914 projecting inward from the rim body segment 912. The flange 914 includes one or more recesses 915 that may aid in mechanically coupling the segment 912 to a wheel body that is over-molded onto the outer rim 900, and in the illustrated form further includes a neck 916 that extends to a head 918 including a pair of shoulders 919.

The outer rim 900 may, for example, be assembled by arranging a plurality of the modular segments 910 such that the body segments 912 form a generally annular outer rim body while interlocking the flange 914 of each segment 910 with the inner rim 320. For example, the neck 916 of each segment 910 may be inserted into a corresponding slot 326, 326' of the inner rim 320 such that the shoulders 919 restrict movement of the segment 910 relative to the inner rim 320. The outer rim 900 and the inner rim 320 may then be over-molded with an elastomeric material (which may include UHMWPE powder) to form at least a portion of a press wheel. After the over-molding process is complete such that the wheel body secures the segments 910 in place, the heads 918 may be trimmed from the inner perimeter to provide space for insertion of a bearing.

Figure 18:
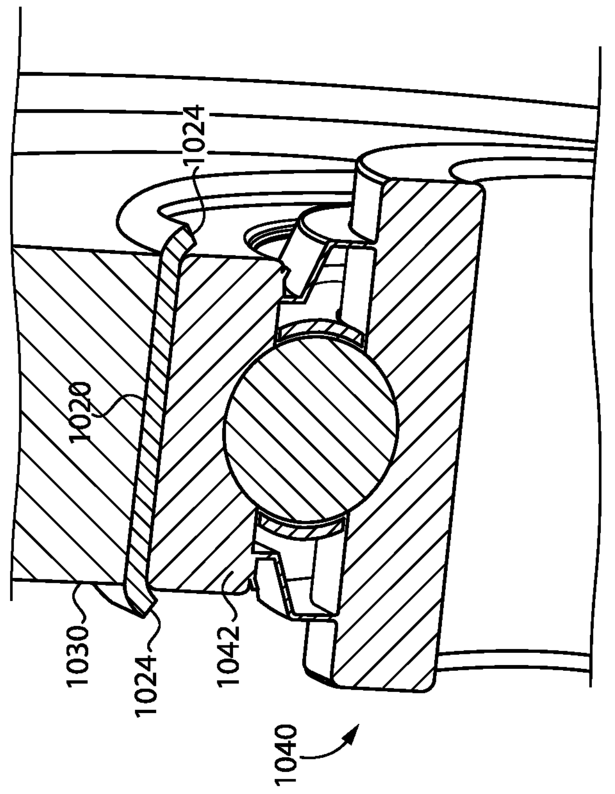
FIG. 18 is a cutaway view of a portion of the press wheel illustrated in FIG. 17.
Figure 17:
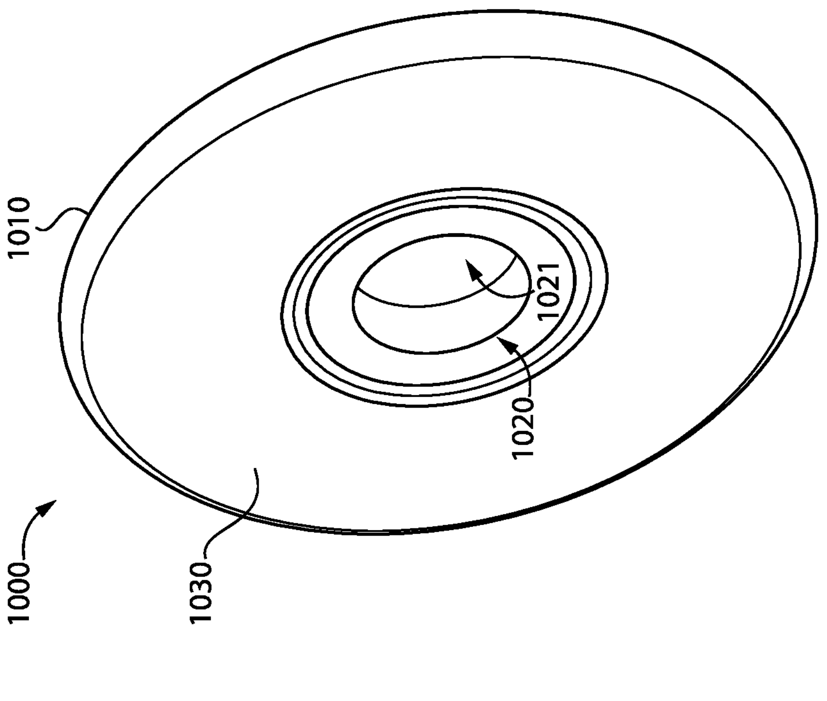
FIG. 17 is a perspective view of a press wheel according to certain embodiments.

With additional reference to FIGS. 17 and 18, illustrated therein is a press wheel 1000 according to certain embodiments. The press wheel 1000 may, for example, be utilized in the press wheel assembly 200 and/or as the press wheel 136 of the above-described row units 130. The press wheel 1000 generally includes an outer rim 1010, an inner rim 1020, and a wheel body 1030. In the illustrated form, the outer rim 1010 is integrally formed with the wheel body 1030. It is also contemplated that the outer rim 1010 may be formed as a separate component, and that the wheel body 1030 may be over-molded onto such a separate component. The outer rim 1010 may, by way of example, be provided in any of the forms described above with reference to FIGS. 5-16.

In the illustrated form, the inner rim 1020 is annular, and projects axially beyond the faces of the wheel body 1030, which may be over-molded onto the inner rim 1020. A bearing 1040 may then be inserted into the central opening 1021 of the inner rim 1020, and the edges of the inner rim 1020 may be deformed radially inward to capture the outer race 1042 of the bearing 1040 between two lips 1024.

Figure 19:
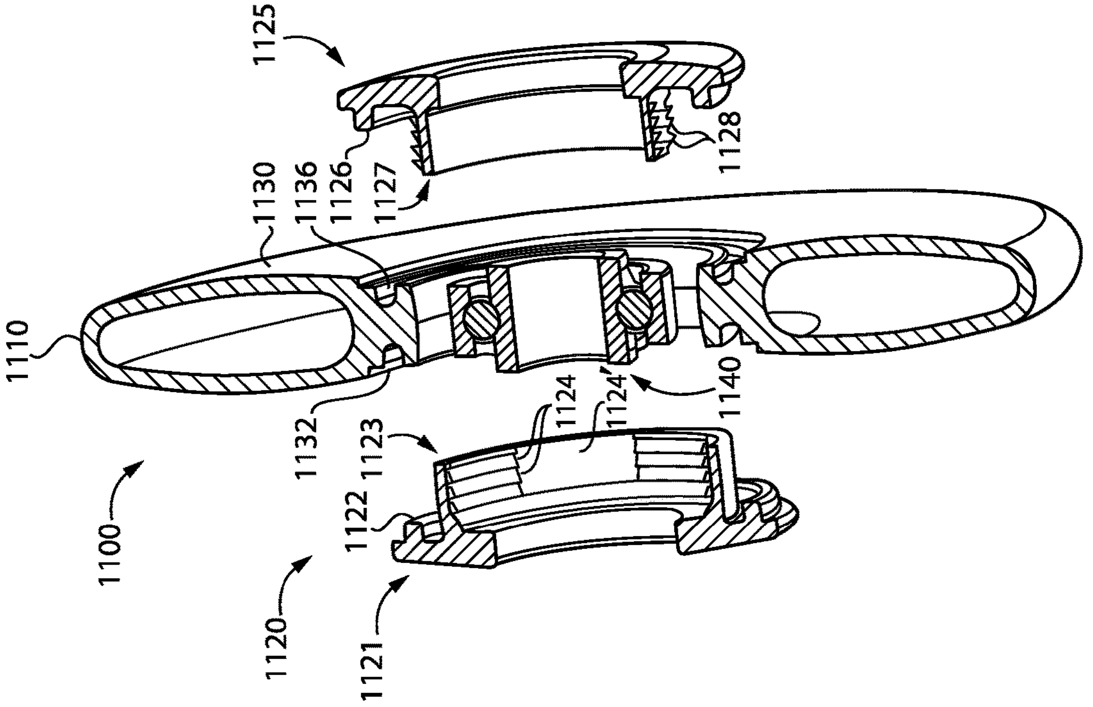
FIG. 19 is an exploded cutaway view of a press wheel according to certain embodiments.
Figure 20:
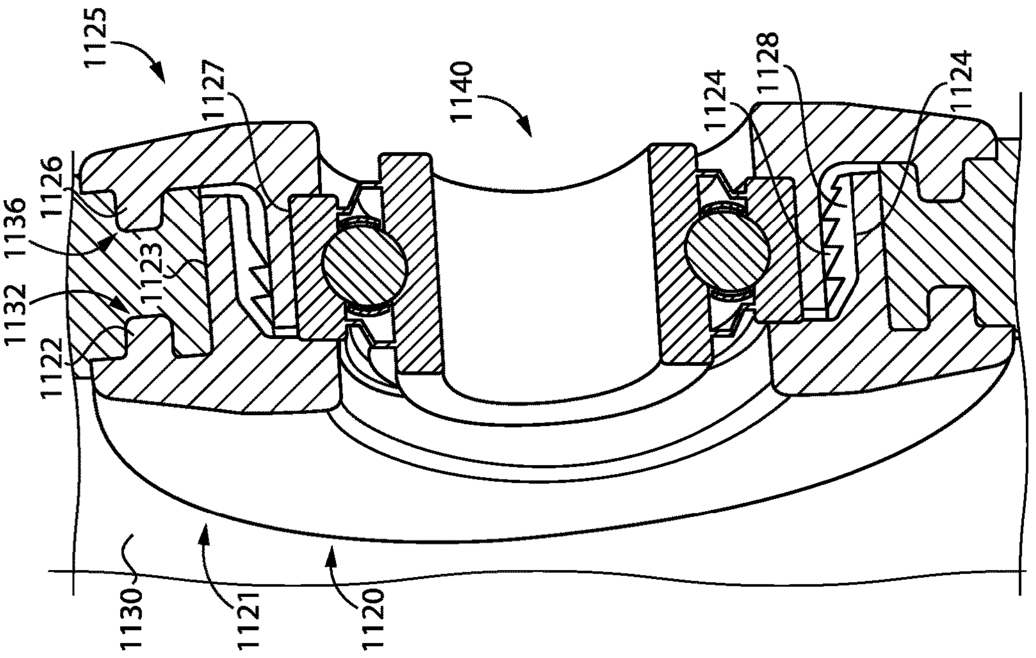
FIG. 20 is a cutaway view of a portion of the press wheel illustrated in FIG. 19.

With additional reference to FIGS. 19 and 20, illustrated therein is a press wheel 1100 according to certain embodiments. The press wheel 1100 may, for example, be utilized in the press wheel assembly 200 and/or as the press wheel 136 of the above-described row units 130. The press wheel 1100 generally includes an outer rim 1110, an inner rim 1120, and a wheel body 1130. In the illustrated form, the outer rim 1110 is integrally formed with the wheel body 1130. It is also contemplated that the outer rim 1110 may be formed as a separate component, and that the wheel body 1130 may be over-molded onto such a separate component. By way of example, the outer rim 1110 may be provided in any of the forms described above with reference to FIGS. 5-16.

In the illustrated form, the inner rim 1120 comprises a pair of interlocked components. The interlocked components include a first component 1121 and a second component 1125, which interlock with one another via an interlock mechanism 1129. The first component 1121 includes an annular projection 1122 that is received in an annular groove 1132 of the wheel body 1130 to discourage relative radial shifting of the first component 1121 and the wheel body 1130. Similarly, the second component 1125 may include an annular projection 1126 that is received in an annular groove 1136 of the wheel body 1130 to discourage relative radial shifting of the second component 1125 and the wheel body 1130.

The first component 1121 includes a female boss 1123, and the second component 1125 includes a male boss 1127 sized and shaped to be received in the female boss 1123. The outer side of the female boss 1123 generally conforms to the inner periphery of the wheel body 1130, and the inner side of the male boss 1127 generally conforms to the outer periphery of a bearing 1140. The inner side of the female boss 1123 includes one or more first engagement features 1124 of the interlock mechanism 1129, and the outer side of the male boss 1127 includes one or more second engagement features 1128 of the interlock mechanism 1129.

The interlock mechanism 1129 is configured to at least selectively interlock the first component 1121 with the second component 1125 to thereby capture the bearing 1140 within the inner rim 1120. In the illustrated form, the engagement features 1124, 1128 are configured to snap into engagement with one another as the male boss 1127 is inserted into the female boss 1123. It is also contemplated that the interlock mechanism 1129 may be configured to interlock the components 1121, 1125 in another manner. As one example, the engagement features 1124, 1128 may be provided in the form of threads, and the male boss 1127 may screw into the female boss 1123. In certain forms, one or more of the engagement features on each side of the interlock mechanism 1129 may include gaps 1124' which, when aligned, reduce the force required to axially separate the two components 1121, 1125. For example, the interlock mechanism 1129 may be provided in a form in which a quarter turn aligns the gaps 1124' to facilitate separation of the two components 1121, 1125.

Figure 22:
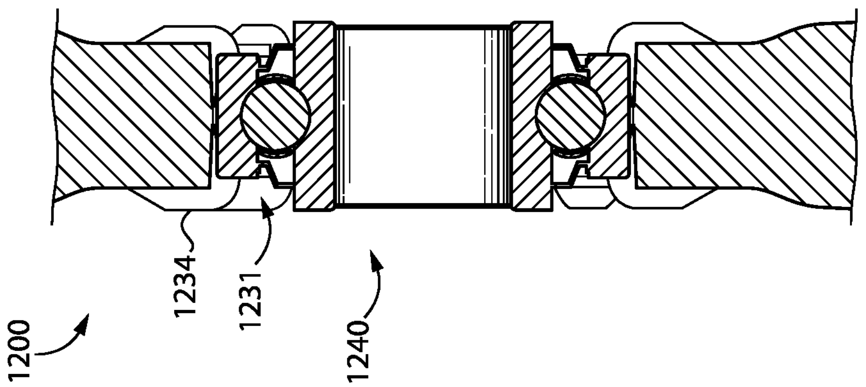
FIG. 22 is a cutaway view of a portion of the press wheel illustrated in FIG. 21.
Figure 21:
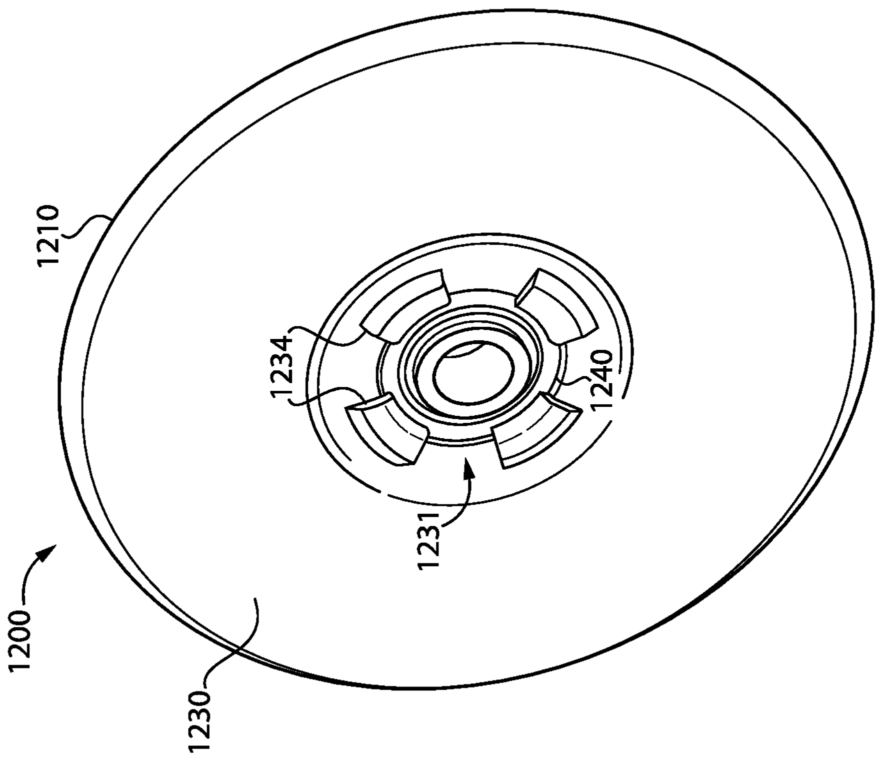
FIG. 21 is a perspective view of a press wheel according to certain embodiments.

With additional reference to FIGS. 21 and 22, illustrated therein is a press wheel 1200 according to certain embodiments. The press wheel 1200 may, for example, be utilized in the press wheel assembly 200 and/or as the press wheel 136 of the above-described row units 130. While not specifically illustrated in FIG. 21, it should be appreciated that the outer rim 1210 of the press wheel 1200 may be provided along the lines of the outer rims described with reference to FIGS. 5-16, or may be integrally formed with the wheel body 1230.

The press wheel 1200 generally includes a wheel body 1230 and a bearing 1240 seated in a central opening 1231 of the wheel body 1230. The wheel body 1230 is provided with (e.g., integrally formed with) a plurality of lips 1234, each of which projects beyond the outer periphery of the central opening 1231 to partially enclose the central opening 1231. The bearing 1240 may be inserted into the central opening 1231 such that the lips 1234 axially retain the bearing 1240 within the opening 1231.

Figure 23:
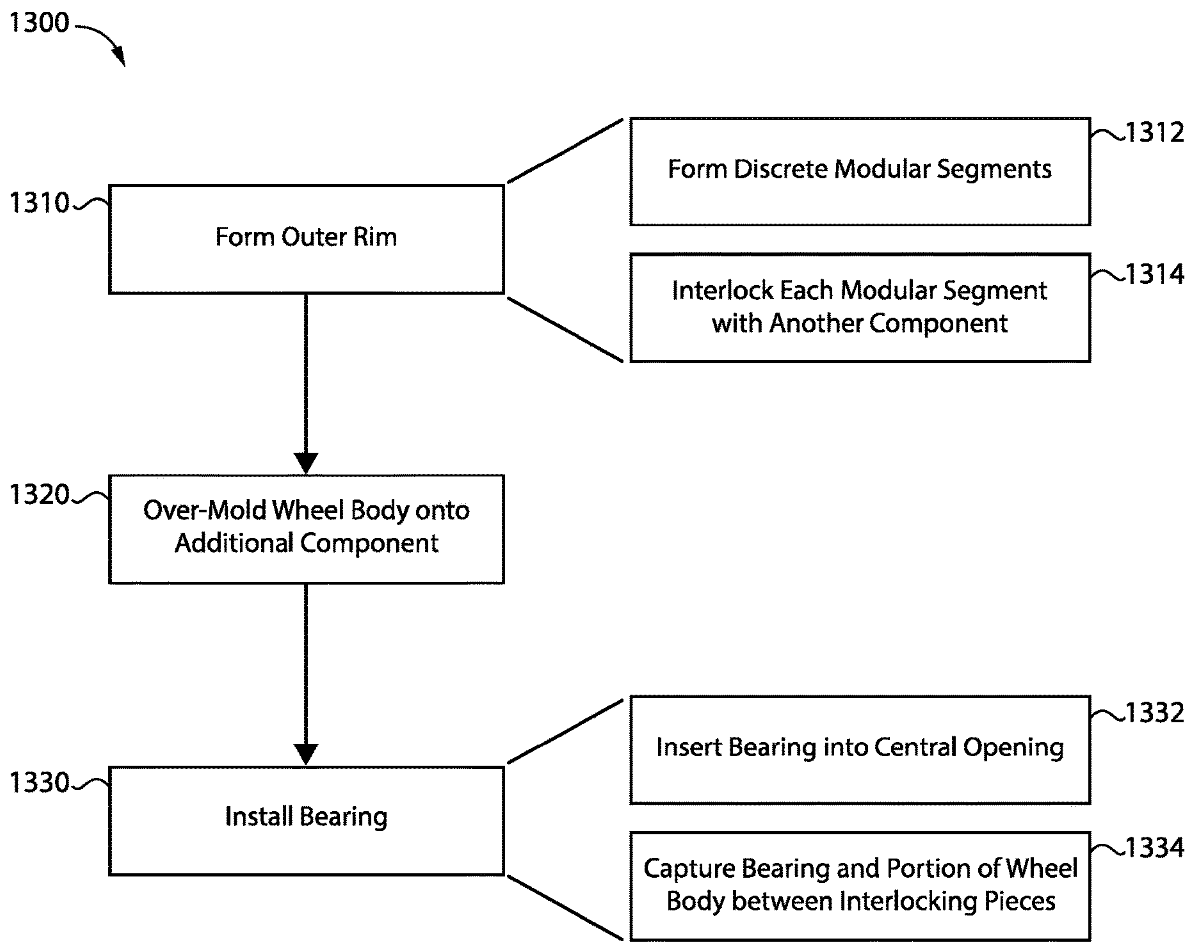
FIG. 23 is a schematic flow diagram of a process according to certain embodiments.

With additional reference to FIG. 23, illustrated therein is an exemplary process 1300 that may be performed to produce a press wheel. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another.

The process 1300 may begin with block 1310, which generally involves forming an outer rim of a press wheel. The outer rim may, for example, be formed of a plastic material, such as UHMWPE or a material comprising UHMWPE. In certain embodiments, block 1310 may involve forming the outer rim as a single-piece construction, for example by molding the outer rim. It is also contemplated that block 1310 may involve forming the outer rim from a plurality of modular segments.

By way of example, block 1310 may include block 1312, which generally involves forming a plurality of discrete modular segments. In certain embodiments, block 1312 may involve forming each modular segment with a rim body segment and a flange projecting inward from the rim body segment. Block 1310 may further involve block 1314, which generally involves interlocking each modular segment with another component to form the outer rim.

In certain embodiments, the component with which the modular segment is interlocked in block 1314 may be another modular component. For example, when forming the outer rim 800 of the modular segments 810, each modular segment 810 may be interlocked with adjacent modular segments via engagement of the tongues 816 and grooves 818. Additionally or alternatively, the component with which the modular segment is interlocked may be an inner rim. For example, when forming the outer rim 900 of the modular segments 910, the heads 918 may be positioned in the central opening 321 of the inner rim 320 such that the neck 916 extends through one of the slots 326, 326'.

The process 1300 may include block 1320, which generally involves over-molding a wheel body onto at least one additional component. In certain embodiments, the at least one additional component comprises an outer rim, such as the outer rim formed in block 1320. Additionally or alternatively, the at least one additional component may comprise an inner rim, such as the inner rim 320 illustrated in FIG. 4. In certain forms, the inner rim includes a plurality of recesses (e.g., slots 326, 326') such that the over-molding process results in one or more ridges 336 received in and engaged with the recesses.

In certain embodiments, the outer rim onto which the wheel body is over-molded may include a rim body and a plurality of flanges projecting inward from the rim body. In some such forms, one or more of the flanges may include openings (e.g., the openings 415 in the outer rim 410 illustrated in FIG. 6) such that the over-molding forms the wheel body with one or more projections that extend into the openings. In certain forms, one or more of the flanges may extend axially and partially define a face of the press wheel, for example as illustrated in FIGS. 11 and 12.

The process 1300 may include block 1330, which generally involves installing a bearing to the press wheel. For example, block 1330 may include block 1332, which generally involves inserting the bearing into a central aperture of the wheel body. Block 1330 may also include block 1334, which generally involves capturing a radially outer portion of the bearing and a radially inner portion of the wheel body between a pair of interlocking pieces, thereby coupling the bearing with the wheel body. For example, block 1334 may involve capturing the outer race of the bearing 1140 and a portion of the wheel body 1130 between the interlocking components 1121, 1125 of the inner rim 1120 illustrated in FIGS. 19 and 20.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A press wheel for agricultural equipment, the press wheel comprising:
- an annular inner rim extending along a rotational axis and defining a central opening; and
- a wheel body circumferentially surrounding the inner rim;
- wherein the inner rim comprises a single-piece construction having a first side and a second side opposite the first side, the single-piece construction including a plurality of axially-extending slots, each axially-extending slot extending fully through a radial thickness of the inner rim, the plurality of axially-extending slots comprising:
  - a plurality of first slots that are open to the first side, extend axially from the first side toward the second side, and terminate before reaching the second side; and
  - a plurality of second slots that are open to the second side, extend axially from the second side toward the first side, and terminate before reaching the first side; and
- wherein the first slots and the second slots alternate about a circumference of the inner rim.

2. The press wheel of claim 1, wherein the inner rim comprises a serpentine shape defined at least in part by the plurality of axially-extending slots.

3. The press wheel of claim 1, wherein the wheel body comprises a plurality of ridges; and
- wherein the plurality of ridges are received in and engaged with the plurality of axially-extending slots.

4. The press wheel of claim 1, wherein the inner rim is chemically bonded to the wheel body.

5. The press wheel of claim 1, wherein the wheel body comprises an elastomeric material.

6. The press wheel of claim 1, further comprising a bearing positioned in the central opening and forming a press fit with the inner rim.

7. The press wheel of claim 1, further comprising an outer rim circumferentially surrounding the wheel body;

wherein the outer rim comprises urethane and/or ultra-high molecular weight polyethylene.

8. The press wheel of claim 1, wherein the single-piece construction is formed of metal.

9. A method of manufacturing a press wheel for agricultural equipment, the method comprising:

over-molding a wheel body onto at least one additional component, wherein the at least one additional component comprises an outer rim positioned radially outward of the wheel body and an inner rim positioned radially inward of the wheel body;

wherein the outer rim comprises a plastic material;

wherein the wheel body comprises an elastomeric material different from the plastic material;

wherein the inner rim comprises a plurality of recesses that extend axially from opposite sides of the inner rim; and wherein the over-molding forms the wheel body with a plurality of ridges received in and engaged with the plurality of recesses, the ridges extending from opposite axial sides of the wheel body such that the inner rim is captured axially between the ridges.

10. The method of claim 9, wherein the plastic material comprises urethane and/or ultra-high molecular weight polyethylene.

11. The method of claim 9, wherein the outer rim comprises:

a rim body; and a plurality of flanges projecting inward from the rim body.

12. The method of claim 11, wherein one or more of the flanges comprises one or more openings; and wherein the over-molding forms the wheel body with one or more projections received in the one or more openings.

13. The method of claim 11, wherein one or more of the flanges extends axially, and partially defines a face of the press wheel.

14. The method of claim 9, further comprising, prior to over-molding the wheel body onto the at least one additional component, forming the outer rim of a plurality of modular segments.

15. The method of claim 14, wherein forming the outer rim comprises interlocking one or more of the modular segments with an adjacent one of the modular segments.

16. The method of claim 14, wherein forming the outer rim comprises interlocking one or more of the modular segments with the inner rim.

17. The method of claim 9, further comprising:

inserting a bearing into a central aperture of the wheel body; and capturing an outer portion of the bearing and an inner portion of the wheel body between a pair of interlocking pieces, thereby coupling the bearing with the wheel body.

18. The method of claim 9, wherein the inner rim comprises a single-piece metal construction having a serpentine shape.

19. The method of claim 9, wherein the recesses extend alternatingly from opposite sides of the inner rim about a circumference of the inner rim.

20. The method of claim 9, wherein the over-molding forms the wheel body with the ridges projecting radially into the plurality of recesses from a remainder of the wheel body.

21. The method of claim 9, wherein each of the recesses is provided in the form of a slot that extends fully through a radial thickness of the inner rim.

22. A press wheel for agricultural equipment, the press wheel comprising:

an annular inner rim extending along a rotational axis and defining a central opening, the annular inner rim comprising a first side, a second side axially offset from the first side, and a plurality of slots that extends fully through a radial thickness of the inner rim, the plurality of slots comprising a plurality of first slots extending axially from the first side toward the second side without reaching the second side, and a plurality of second slots extending axially from the second side toward the first side without reaching the first side; and a wheel body circumferentially surrounding the annular inner rim, wherein the wheel body comprises a plurality of first ridges received in the first slots, and a plurality of second ridges received in the second slots.

23. The press wheel of claim 22, wherein the first slots and the second slots alternate about a circumference of the inner rim.

24. The press wheel of claim 22, wherein each of the ridges projects radially into the corresponding slot from a remainder of the wheel body.

* * * * *